United States Patent
Ido (10) Patent No.: US 8,565,678 B2
(45) Date of Patent: Oct. 22, 2013

(54) INFORMATION PROCESSING APPARATUS AND CONTROL METHOD THEREOF

(75) Inventor: Tetsuo Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 12/753,745

(22) Filed: Apr. 2, 2010

(65) Prior Publication Data

US 2010/0255784 A1   Oct. 7, 2010

(30) Foreign Application Priority Data

Apr. 6, 2009  (JP) ................................. 2009-092309

(51) Int. Cl.
*H04B 7/00* (2006.01)
(52) U.S. Cl.
USPC .......................... 455/41.2; 455/41.1; 455/419
(58) Field of Classification Search
USPC ...................... 455/41.1, 41.2, 419, 421, 456.1
See application file for complete search history.

(56) References Cited

U.S. PATENT DOCUMENTS 5,140,697 A *   8/1992  Igarashi ........................ 455/517
2007/0149124 A1*  6/2007  Onozawa ..................... 455/41.2

FOREIGN PATENT DOCUMENTS

JP   2008-92139 A   4/2008

* cited by examiner

*Primary Examiner* — Tuan H Nguyen
(74) *Attorney, Agent, or Firm* — Carter, DeLuca, Farrell & Schmidt LLP (57) ABSTRACT

An information processing apparatus establishes a proximity wireless link with a partner device and utilizes instantaneous interruptions of the wireless link to control processing of data transfer between the information processing apparatus and the partner device. A control unit in the information processing apparatus determines a frequency of the instantaneous interruptions of the wireless link generated within a predetermined time based on a reception state of a plurality of signals transmitted from the partner device, and controls the processing of data transfer between the information processing apparatus and the partner device according to the determined frequency of instantaneous interruptions.

7 Claims, 7 Drawing Sheets

INFORMATION PROCESSING APPARATUS AND CONTROL METHOD THEREOF

BACKGROUND OF THE INVENTION

1. Field of the Invention

The present invention relates to an information processing apparatus and control method thereof.

2. Description of the Related Art

In recent years, close proximity wireless communication (noncontact communication) techniques have proliferated due to widely recognized advantages such as high-speed data transfer, device mobility, and ease of deployment. As an example, a known proximity wireless communication technique is applied to a noncontact integrated circuit (IC) card containing a radiofrequency identification (RFID) circuit. The noncontact IC card is used, for example, as a train pass or the like utilizing an advantage of allowing easy access between devices.

A communication method for proximity wireless communication includes near field communication (NFC) using electromagnetic induction, TransferJet (registered trademark) using induction field, and the like.

The above-named proximity wireless communication methods are limited to significantly short communication distances. Thus, when close proximity communication devices are located close to each other, within a communication range (e.g., in NFC, within 10 cm, and in TransferJet, within 3 cm), a wireless link is established therebetween. When the respective devices are located away from each other (out of the communication range), the wireless link is disconnected.

Japanese Patent Application Laid-Open No. 2008-92139 discusses executing disconnection processing of an upper layer protocol when a predetermined time has elapsed after a wireless link is disconnected.

Thus, in the proximity wireless communication, the wireless link can be connected or disconnected by an intuitive user operation by locating respective devices close thereto or away therefrom. Accordingly, the respective devices connected with the wireless link are once located apart therefrom and are immediately located close thereto, thereby allowing instantaneous interruption of the wireless to be intentionally generated. The instantaneous interruption of the wireless link indicates that the wireless link is reconnected within predetermined time (e.g., within 200 milliseconds) after the wireless link is disconnected.

However, conventionally, utilizing intentionally-generated instantaneous interruption of a wireless link to control an application on a device has not been considered.

SUMMARY OF THE INVENTION

According to an aspect of the present invention, an information processing apparatus having a wireless communication function of establishing a wireless link with a partner device when a distance between the information processing apparatus and the partner device is within a predetermined range and of disconnecting the wireless link when the distance is out of the predetermined range includes: a receiving unit configured to receive a plurality of wireless signals transmitted from the partner device, with which the wireless link is established, within a predetermined time; a determination unit configured to determine a frequency of instantaneous interruptions of the wireless link generated within the predetermined time based on a reception state of the receiving unit; and a control unit configured to control processing concerning data transfer between the information processing apparatus and the partner device according to the frequency of the instantaneous interruptions determined by the determination unit.

According to another aspect of the present invention, an information processing apparatus includes: an establishing unit configured to establish a wireless link with a partner device; a receiving unit configured to receive a plurality of signals transmitted from the partner device, with which the wireless link by the establishing unit is established, within a predetermined time; a determination unit configured to determine a frequency of instantaneous interruptions of the wireless link generated within the predetermined time based on a reception state of the receiving unit; a selection unit configured to select an application to be started according to the frequency of instantaneous interruptions determined by the determination unit; and a transfer unit configured to start the application selected by the selection unit to execute data transfer processing according to the application.

According to yet another aspect of the present invention, a control method of an information processing apparatus having a wireless communication function of establishing a wireless link with a partner device when a distance between the information processing apparatus and the partner device is within a predetermined range and of disconnecting the wireless link when the distance is out of the predetermined range, the control method comprising: determining a frequency of instantaneous interruptions of a wireless link generated within a predetermined time based on a reception state of a plurality of signals transmitted from the partner device within the predetermined time; and controlling an application according to the frequency of instantaneous interruptions determined.

According to yet another aspect of the present invention, a control method of an information processing apparatus includes: determining a frequency of instantaneous interruptions of a wireless link generated within a predetermined time based on a reception state of signals transmitted from a partner device, with which the wireless link is established, within the predetermined time; selecting data to be transferred from the information processing apparatus to the partner device according to the determined frequency of instantaneous interruptions; and transferring the selected data to the partner device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 3:
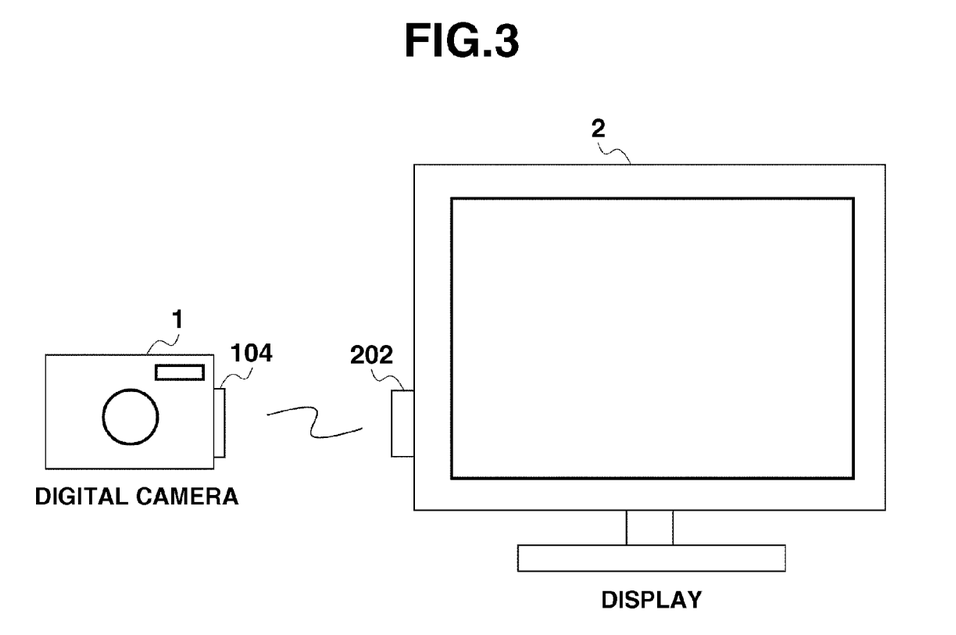
FIG. 3 illustrates a system configuration example of an image data transfer system.

A configuration of an image data transfer system in the present exemplary embodiment is illustrated in FIG. 3.

In the embodiment of FIG. 3, the image data transfer system includes a digital camera 1 and a display 2 with a proximity wireless communication function therebetween. Examples of proximity wireless communication techniques include NFC, TransferJet® or the like. However, other communication methods can also be applied to the proximity wireless communication. A distance between an antenna 104 to be provided on the digital camera 1 and an antenna 202 to be provided on the display 2 is proximately located within a range of several millimeters to several centimeters. Thus, a wireless link is established (connected) to allow image data to be transferred from the digital camera 1 to the display 2.

The display 2 includes a display function for displaying image data received from the digital camera 1 on a display unit 203 and a storage function for saving (storing) the image data in a storage unit 204. The display 2 allows the respective functions not only to be selectively operated but also to be operated in parallel.

In the present exemplary embodiment, a predetermined number of operations is executed in which the digital camera 1 and the display 2 are proximately located to connect the wireless link, and then, after the wireless link is temporarily disconnected by an intentional user operation, the digital camera 1 and the display 2 are proximately located again to reconnect the wireless link. In the following description, reconnecting the wireless link within predetermined time after the wireless link is disconnected will be described as "instantaneous interruption" of the wireless link.

To better distinguish an instantaneous interruption from, for example, a "permanent interruption", it should be understood that in a permanent interruption the wireless link is completely disconnected when the wireless link is not reconnected within the predetermined time after the wireless link is disconnected. The above-described predetermined time to determine whether an instantaneous interruption occurs or not is set in consideration of a user operation speed in which the digital camera 1 is once located apart form the display 2 and then is repeatedly located close thereto (e.g., within 200 mSec).

The predetermined time may be set prior to delivery of the digital camera 1 from a factory, or the digital camera 1 may be configured so that a user can set the predetermined time based on personal preferences. Now, an example of detecting instantaneous interruption of the wireless link generated by such the user operation to control data transfer processing between the digital camera 1 and the display 2 according to characteristics of the detected instantaneous interruption will be described.

Figure 1:
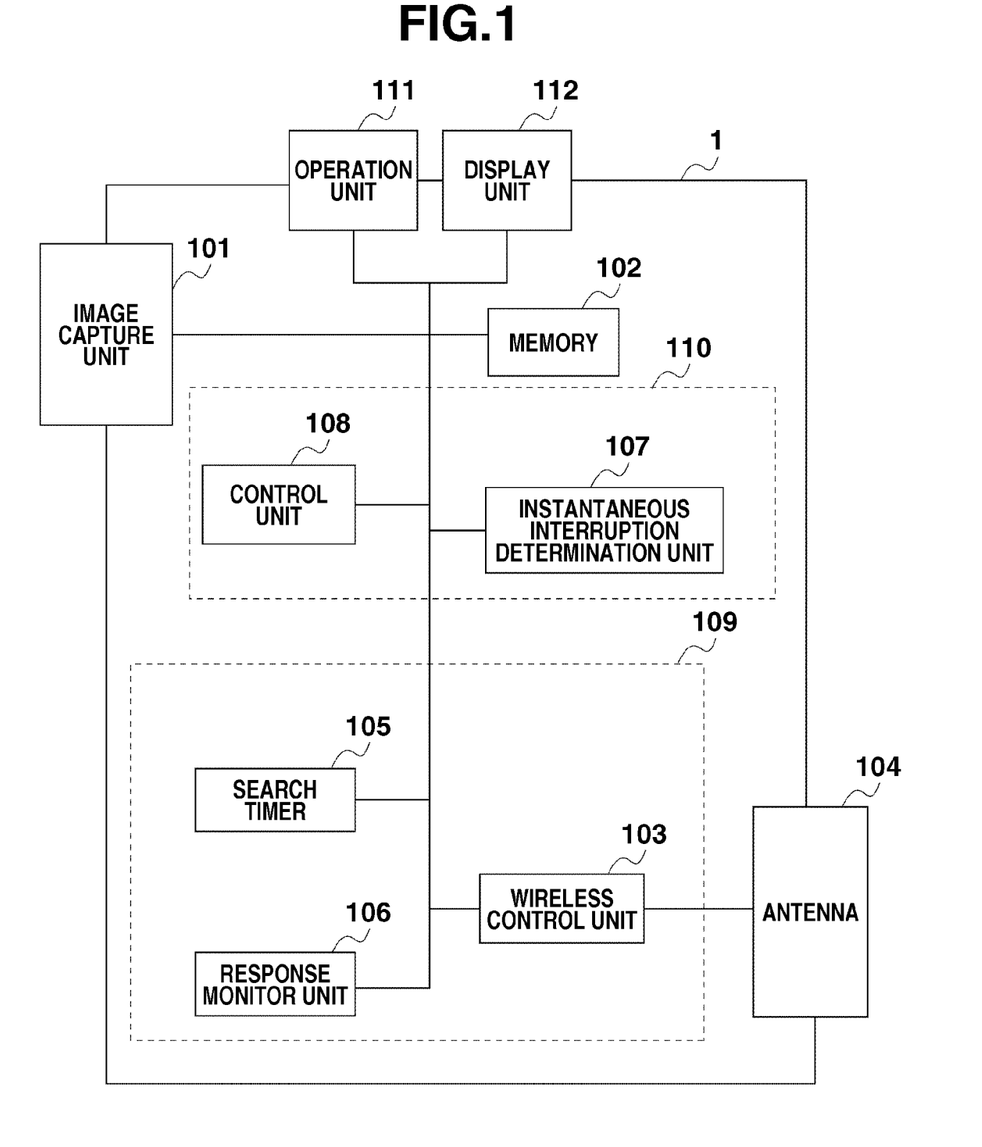
FIG. 1 is a block diagram illustrating a configuration example of a digital camera.

A block diagram illustrating a configuration example of the digital camera 1 according to the present exemplary embodiment is illustrated in FIG. 1. An image capture unit 101 generates image data from an optical image of an object. A memory 102 stores the image data generated by the image capture unit 101 and other various types of information.

A wireless control unit 103 realizes a proximity wireless communication function. An antenna 104 transmits or receives a signal by proximity wireless communication. The wireless control unit 103 controls whether the wireless link by the proximity wireless communication is in a connection state or a disconnection state.

A search timer 105 measures transmission time of a search packet and generates an event when the transmission time ends. Time to be measured by the search timer 105 may be set on a device in delivery from a factory or may be provided so that a user can set later.

A response monitor unit 106 monitors the presence or absence of reception of a search response packet to a search packet and notifies to an instantaneous interruption determination unit 107 of the reception state of the search response packet as response information. The search packet is a confirmation signal to be transmitted in order to confirm whether the connected wireless link is maintained. A device on the other end of the wireless link (e.g., display 2 in FIG. 3) that has normally received the search packet is controlled so as to transmit the search response packet as a response signal. For purposes of the present specification, the digital camera 1 may also be referred to as an information processing apparatus, and the display 2 may also be referred to as a partner device.

The instantaneous interruption determination unit 107 detects an instantaneous interruption from response information notified from the response monitor unit 106 and also analyzes characteristics of the instantaneous interruption such as a frequency of the instantaneous interruption, an interval of the instantaneous interruption, and a pattern (rhythm) of the instantaneous interruption. A control unit 108 controls processing of the whole digital camera 1. The control unit 108 controls processing concerning data transfer according to the characteristics of the instantaneous interruption determined by the instantaneous interruption determination unit 107.

Further, a communication processing unit 109 includes the wireless control unit 103, the search timer 105, and the response monitor unit 106. An application processing unit 110 includes the instantaneous interruption determination unit 107 and the control unit 108.

On an operation unit 111, a user performs various operations such as an image capture instruction and a start instruction of the proximity wireless communication. A display unit 112 displays image data generated by the image capture unit 101, a message to prompt a user to perform various operations, and the like.

Figure 2:
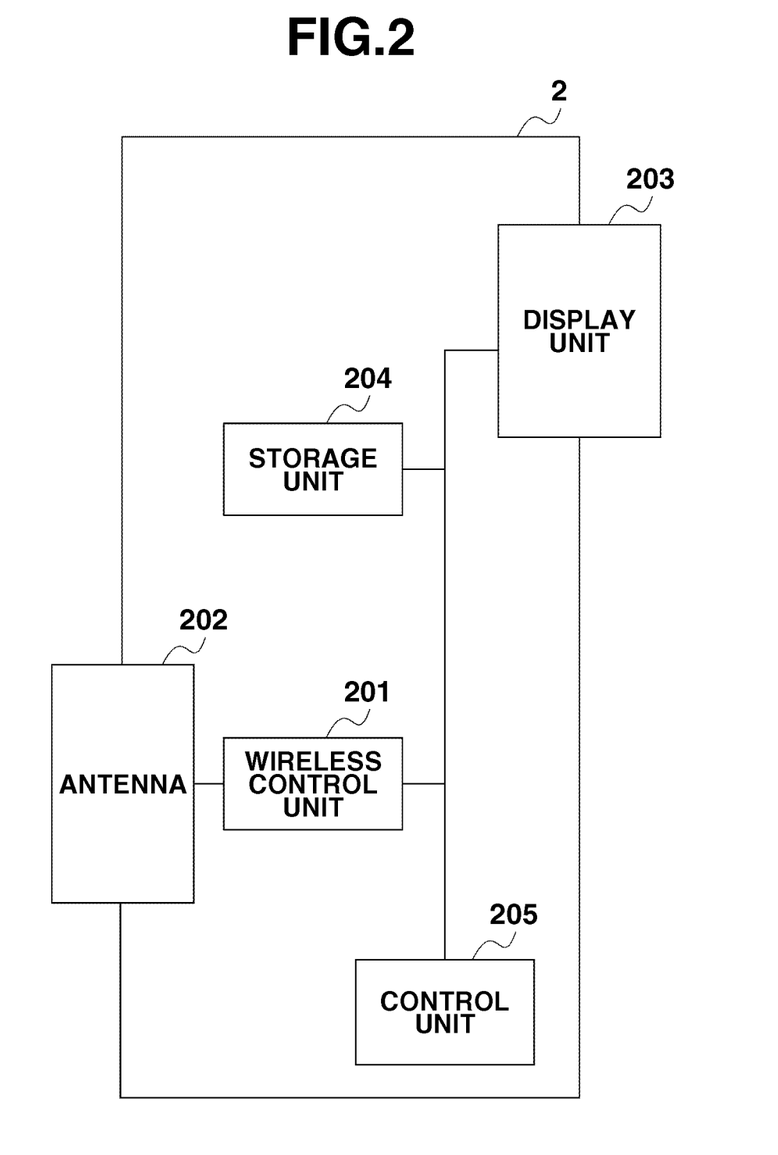
FIG. 2 is a block diagram illustrating a configuration example of a display.

FIG. 2 is a block diagram illustrating a configuration example of the display 2 according to the present exemplary embodiment. A wireless control unit 201 realizes the proximity wireless communication function. An antenna 202 transmits or receives a signal by the proximity wireless communication. The wireless control unit 201 controls whether the wireless link by the proximity wireless communication is in the connection state or the disconnection state.

A display unit 203 displays image data transferred from the digital camera 1 via the proximity wireless communication function, and other various types of information. A storage unit 204 stores image data transferred from the digital camera 1, and other various types of information. A control unit 205 controls processing of the whole display 2.

The above-described functional block configuration is an example. A plurality of functional blocks may also configure one functional block. Any functional block may also further be separated into a plurality of blocks that executes different functions.

Figure 4:
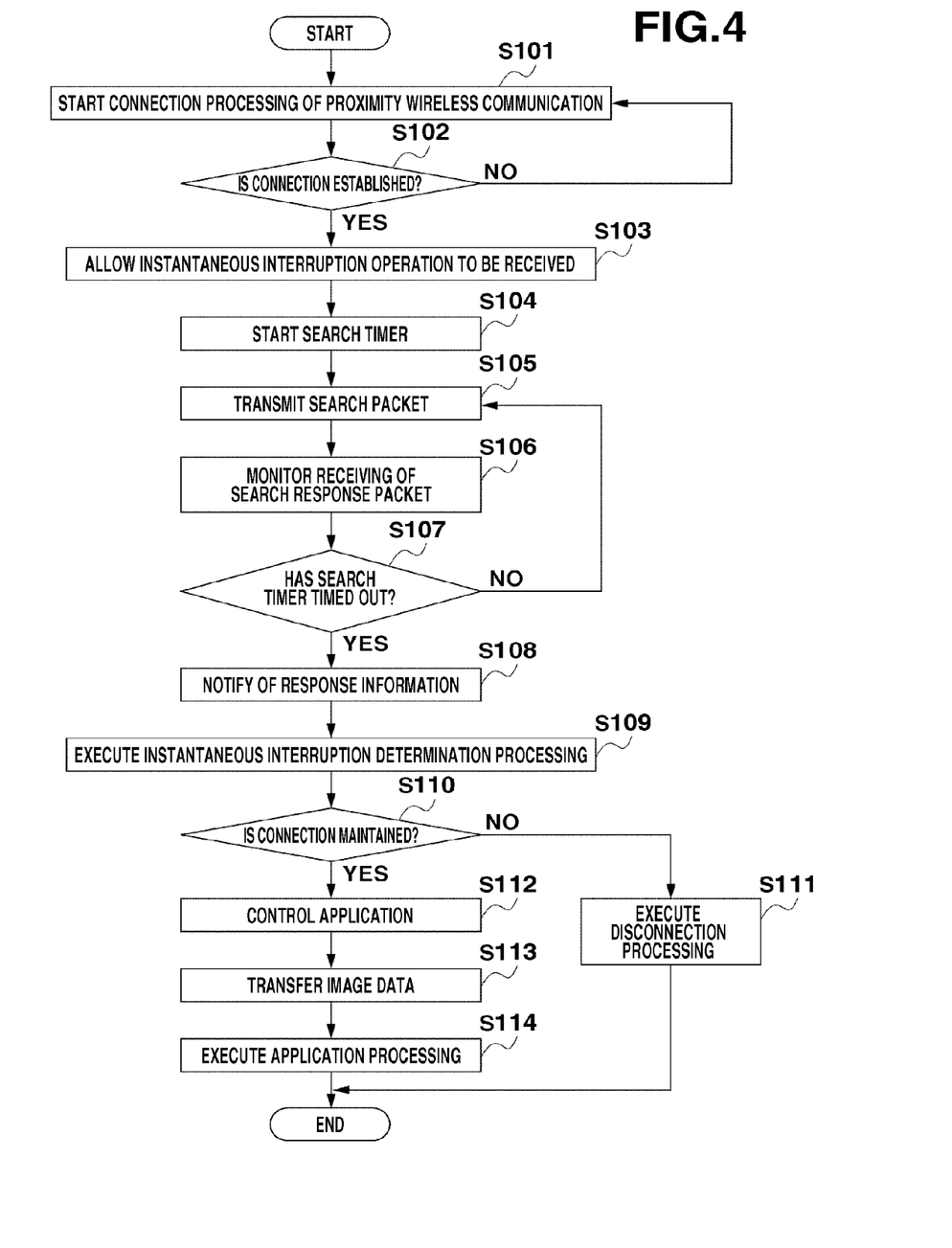
FIG. 4 is a flowchart illustrating operation processing of a digital camera.

A processing flow of the digital camera 1 according to the present exemplary embodiment is illustrated in FIG. 4.

The proximity wireless communication function of the digital camera 1 and the display 2 is in a state to allow a wireless link to be connected. In a stage of starting this processing flow, the state of a wireless link to be controlled by the wireless control unit 103 on the digital camera 1 and the wireless control unit 201 on the display 2 is in the disconnection state.

Further, in the memory 102 provided on the digital camera 1, image data captured by the image capture unit 101 in advance or image data acquired from other devices via the proximity wireless communication is stored.

First, in step S101, when a user performs a start instruction operation of the proximity wireless communication using the operation unit 111 on the digital camera 1, the wireless control unit 103 starts connection processing of the proximity wireless communication.

The user holds the digital camera 1 by hands and disposes the antenna 104 on the digital camera 1 and the antenna 202 on the display 2 so as to be proximately located. When disposition of both antennas is in a proximity state, connection is established and thus the wireless link is connected (YES in step S102). In step S102, the state of the wireless link to be controlled by the wireless control unit 103 on the digital camera 1 and the wireless control unit 201 on the display 2 is changed from the disconnection state to the connection state repeatedly.

In FIG. 4, it has been described that in step S101 the user performs the start instruction operation of the proximity wireless communication to thereby start connection processing. However, the user operation may not necessarily be performed. For example, the antenna 104 on the digital camera 1 and the antenna 202 on the display 2 may only need to be located proximate to each other to thereby cause connection processing of the wireless link to be automatically started by the wireless control unit 103 and the wireless control unit 201.

In step S103, the state of the wireless link is in the connection state. When the state of the wireless link is in the connection state, the digital camera 1 results in a state to allow a user operation for instantaneously interrupting the wireless link (hereinafter, referred to as an instantaneous interruption operation) to be accepted. At this time, a message for notifying the user that the instantaneous interruption operation is acceptable may be displayed on the display unit 112. Then, in step S104, the digital camera 1 starts the search timer 105 for measuring a period of time to be acceptable for the instantaneous interruption operation.

In order to intentionally generate the instantaneous interruption of the wireless link, the user executes a predetermined number of instantaneous interruptions operations during the period until the search timer 105 ends (e.g., within 5 sec). The instantaneous interruption operation is such that the digital camera 1 is once located apart from the display 2, and then the digital camera 1 is located close to the display 2. Then, an application to be started is selected according to the characteristics of the instantaneous interruption generated during the period until the search timer 105 ends.

The characteristics of the instantaneous interruption includes, for example, a frequency of the instantaneous interruption, an interval of each instantaneous interruption, and a pattern (rhythm) of the instantaneous interruption. The pattern of the instantaneous interruption can be determined using the frequency and the interval of the instantaneous interruption.

In FIG. 4, an example of selecting the application to be started according to the frequency of the instantaneous interruption generated during the period until the search timer 105 ends will be described.

For example, when two instantaneous interruptions have been generated, the digital camera 1 starts an image display application, transmits image data to the display 2, and causes the display unit 203 on the display 2 to display the image data.

Further, when three instantaneous interruptions have been generated, the digital camera 1 starts an image storage application, transmits image data to the display 2, and causes the storage unit 204 on the display 2 to store the image data.

Furthermore, when four instantaneous interruptions have been generated, the digital camera 1 starts an image display-storage application, transmits image data to the display 2, and causes the display unit 203 on the display 2 to display the image data, and causes storage unit 204 on the display 2 to store the image data. Thus, in the present exemplary embodiment, instantaneous interruption is intentionally generated with the predetermined frequency corresponding to an application that the user intends to use.

The present exemplary embodiment has been described in which the instantaneous interruption operation is triggered by the connection of the wireless link to be changed into an acceptable state of the instantaneous interruption operation. However, a change in a state may also be executed using another trigger. For example, when an instruction to shift to an instantaneous interruption operation acceptance mode is made via the operation unit 111, the instantaneous interruption operation may also be changed into the acceptable state.

Thus, a method for controlling an application using a normal user interface (UI) such as the operation unit 111 and the display unit 112, and a method for controlling an application by the instantaneous interruption operation can suitably be switched by the intention of the user.

In step S105, the digital camera 1 transmits a search packet to the display 2. In step S106, the digital camera 1 monitors the presence or absence of a search response packet from the display 2. In step S107, the digital camera 1 determines whether the search timer 105 has timed out. If the search timer 105 has not timed out (NO at step S107), the digital camera 1 periodically transmits the search packet (e.g., for a period of 100 msec) until the search timer 105 is timed out (YES at step S107).

The transmission period of the search packet can suitably be set so that instantaneous interruption is detectable. For example, in order to detect instantaneous interruption having instantaneous interruption time of T sec or longer, a transmission interval of the search packet is preferably set to T/2 sec or shorter. The transmission interval of the search packet may be set in delivery from a factory or may be provided so that a user can set later.

In step S108, the response monitor unit 106 on the communication processing unit 109 notifies the application processing unit 110 of the received result of the search response packet as response information. In step S109, the instantaneous interruption determination unit 107 on the application processing unit 110 detects instantaneous interruption from the notified response information and also determines characteristics of the instantaneous interruption. The characteristics of the determined instantaneous interruption include a frequency of the instantaneous interruption, an interval of the instantaneous interruption, a pattern (rhythm) of the instantaneous interruption, and the like.

A processing example until the response monitor unit 106 on the communication processing unit 109 notifies the application processing unit 110 of the received result of the search response packet as response information will be described referring to FIG. 5.

When the instantaneous interruption operation is changed into the acceptable state, the communication processing unit 109 starts the search timer 105, and starts transmission of the search packet. In FIG. 5, to simplify the description, the search packet is transmitted three times until the search timer 105 is timed out.

Once a wireless link between the digital camera 1 and the display 2 has been established, intentionally generated instantaneous interruptions can occurs as follows: Within a period of time to accept the instantaneous interruption operation, the user moves the digital camera 1 so that the antenna 104 on the digital camera 1 and the antenna 202 on the display 2 are not in a proximity state and also immediately moves the digital camera 1 to dispose the digital camera 1 proximal to the display 2 (i.e., in a proximity state). Thus, the user moves the digital camera 1 away from and proximal to the display 2, thereby causing instantaneous interruption of the wireless link between the digital camera 1 and the display 2. That is, the instantaneous interruption is intentionally generated. When the instantaneous interruption starts, the communication processing unit 109 of digital camera 1 transmits a search packet to display 2, at step F501.

Then, a state occurs in which several search packets do not reach the display 2 and the search response packet from the display 2 is not transmitted, or even if the display 2 can receive the search packet, several search response packets do not reach the digital camera 1, at step F502.

Figure 5:
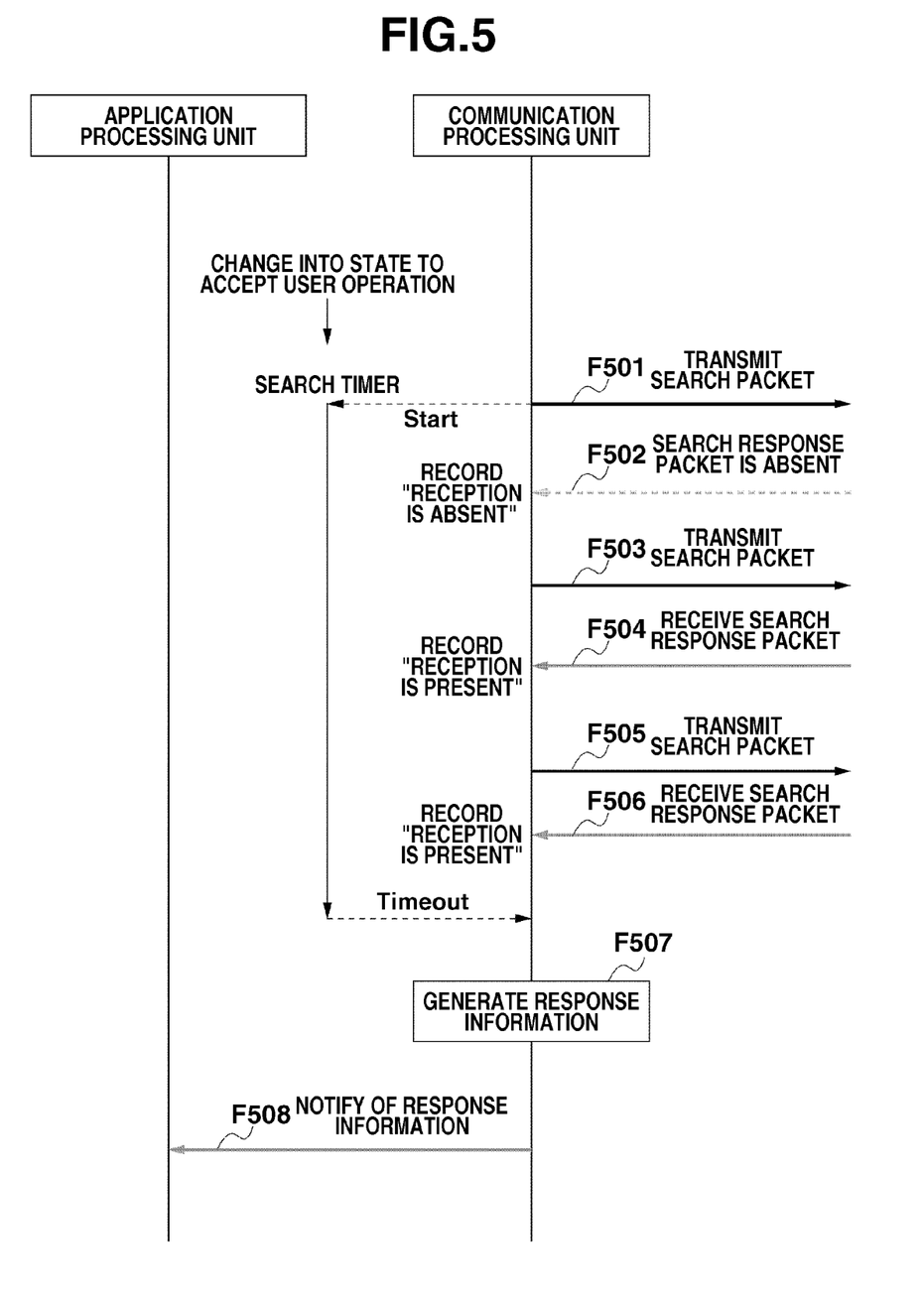
FIG. 5 illustrates an example of notifying an application processing unit of response information from a communication processing unit.

In the example illustrated in FIG. 5, a search response packet in step F502 to a search packet in step F501 cannot be received by the digital camera 1. Thus, the response monitor unit 106 stores "reception of a packet is absent" in memory 102. On the other hand, a search response packet in steps F504 and F506 in response to a search packet transmitted in steps F503 and F505, respectively, can be received by the digital cameral. Thus, the response monitor unit 106 stores "reception of a packet is present" (i.e., reception state) in memory 102.

In step F507, the response monitor unit 106 generates the presence or absence of reception of a search response packet as response information. For example, "reception of packet is present" may be set to "1" and "reception of packet is absent" may be set to "0". Accordingly, in the above-described scenario, response information "011" is generated. Then, in step F508, the response monitor unit 106 notifies the application processing unit 110 of the generated response information.

Figure 6:
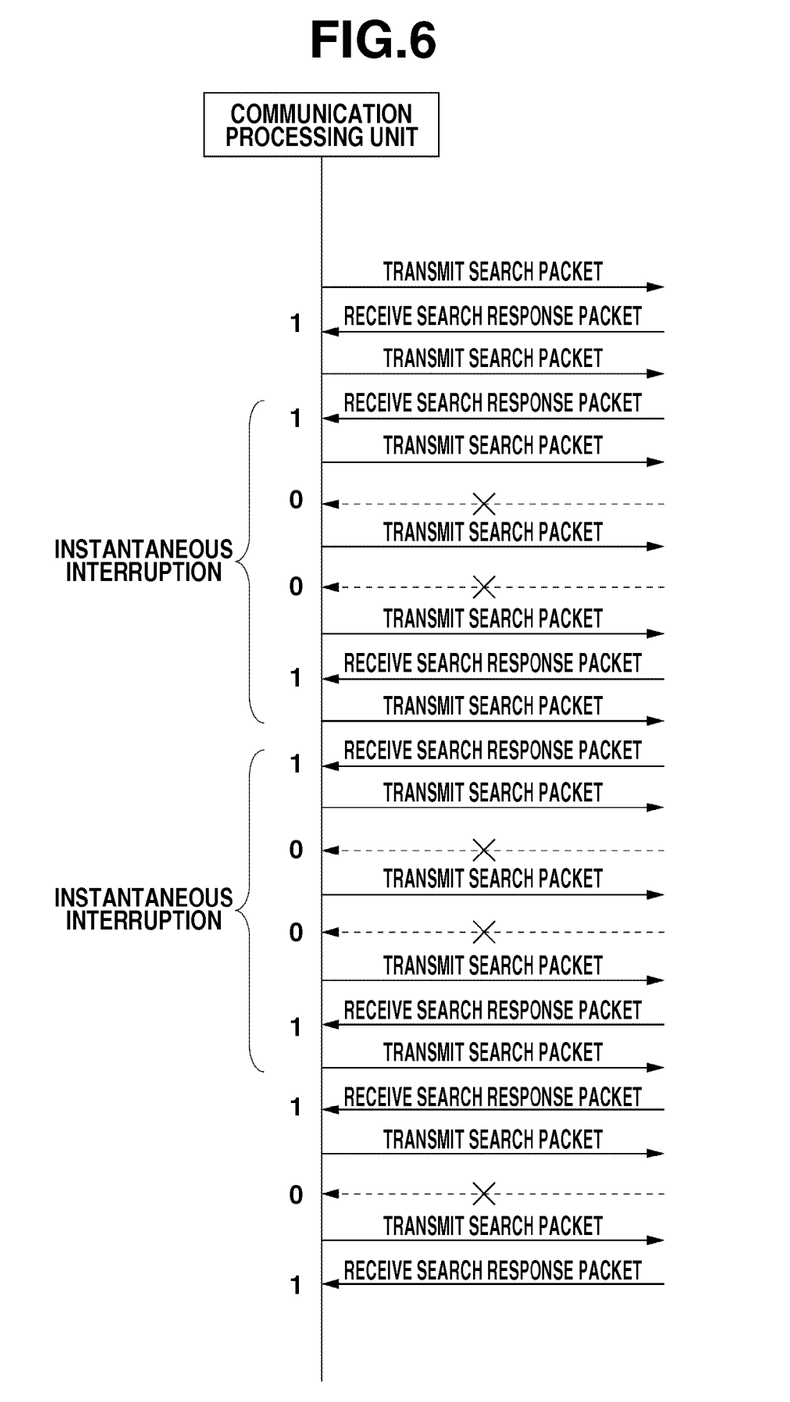
FIG. 6 illustrates an example of a method for detecting instantaneous interruption.
Figure 7:
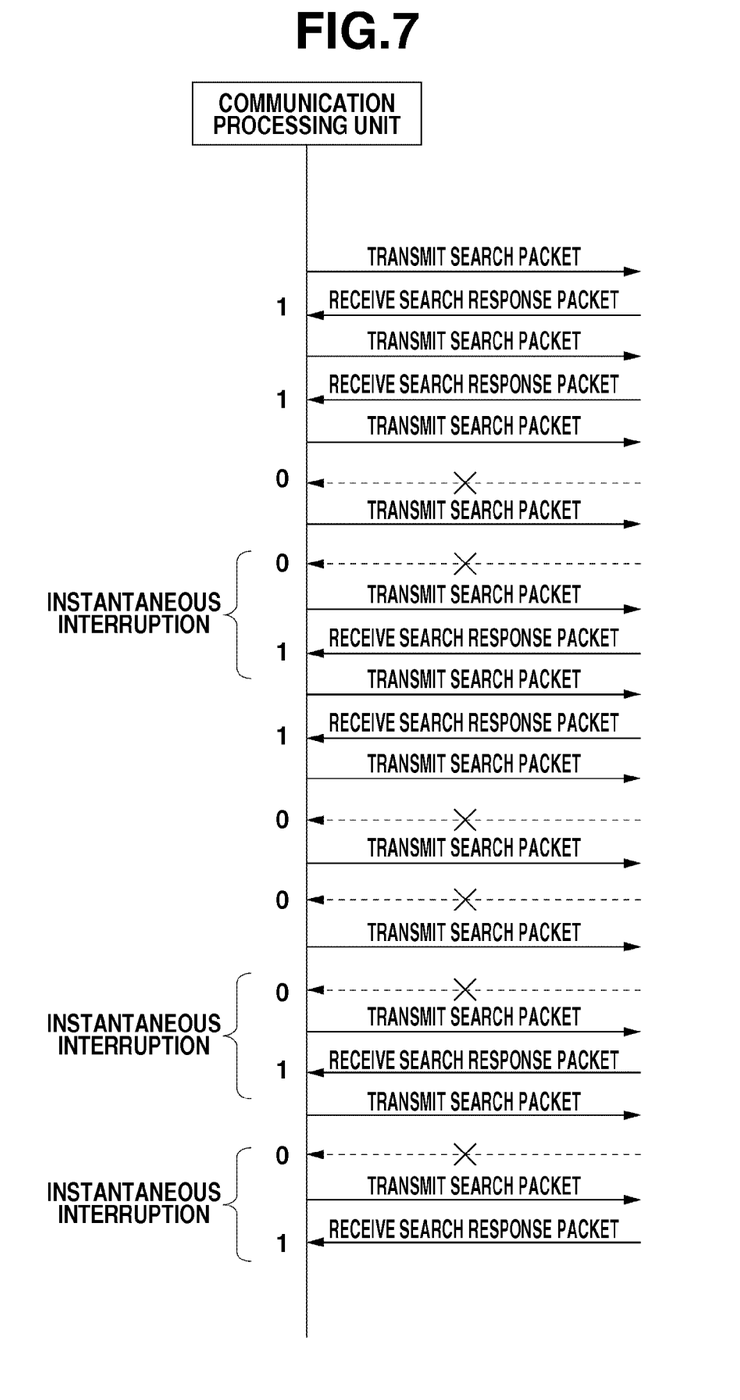
FIG. 7 illustrates another example of a method for detecting instantaneous interruption.

Next, a method in which the instantaneous interruption determination unit 107 on the application processing unit 110 detects interruption determination from response information notified from the response monitor unit 106 will be described in detail referring to FIGS. 6 and 7. FIGS. 6 and 7 are diagrams illustrating the reception state of a search response packet to a search packet. As described above, the response monitor unit 106 on the communication processing unit 109 notifies the application processing unit 110 of the presence or absence of reception of a search response packet as response information.

FIG. 6 is an example of detecting generation of an instantaneous interruption when patterns of "0" and "1" to be contained in the response information are consistent with a predetermine pattern. For example, as a response pattern to detect an instantaneous interruption, "1001" is stored in the memory 102. Then, it is determined whether the response pattern is contained in the response information and how many response patterns are contained therein.

In an example illustrated in FIG. 6, the response information is set to "110011001101". By comparing the response information with the above-described response pattern, the instantaneous interruption determination unit 107 determines that the instantaneous interruption is generated two times. When this method is used, even if a portion of the pattern (e.g., "101") where a search response packet is not received by one time is present in the response information, its portion is not determined as the instantaneous interruption.

Thus, it is particularly effective when executing control such that, for example, if the generated instantaneous interruptions have occurred at a predetermined interval, a predetermined application is started (the user moves digital camera 1 so as to generate instantaneous interruptions at the predetermined interval). It is preferable to prepare a plurality of response patterns for detecting an instantaneous interruption to determine that an instantaneous interruption is generated when it is consistent with any one of the response patterns.

FIG. 7 is an example in which an instantaneous interruption is determined to have been generated at a portion where the response information, the pattern "0" is switched to the pattern "1". In other words, it is an example when the pattern "01" is used as a response pattern to detect the instantaneous interruption. In an example illustrated in FIG. 7, the response information is "110011000101". Since three portions where the pattern is switched from "0" to "1" are detected, the instantaneous interruption determination unit 107 determines that the instantaneous interruption is generated three times.

When this method is used, even if a plurality of search response packets are not continuously received, it is determined that the instantaneous interruption is generated once. In other words, if an operation in which the digital camera 1 is once located apart from the display 2 and the digital camera 1 is repeatedly located close to the display 2 is performed, regardless of the length of time during the digital camera 1 being apart from the display 2, it is determined that the instantaneous interruption is generated once. Accordingly, it is particularly effective, for example, when executing a control to set a predetermined application to be started based on the frequency of the generated instantaneous interruptions. That is, using the above-described control method different applications can be started according to the frequency, interval, duration or pattern of the intentionally generated instantaneous interruptions.

The examples described in FIGS. 6 and 7 are an example of the method for detecting instantaneous interruption. Thus, another method may also be used. An instantaneous interruption may also be detected by combining the methods illustrated in FIGS. 6 and 7. By adaptively using these methods, even if it is influenced by an individual difference in a speed or a difference in timing to move the digital camera 1, an instantaneous interruption can suitably be detected.

Returning now to description of FIG. 4, the digital camera 1 determines the characteristics of the instantaneous interruption in step S109. In step S110, the control unit 108 on the application processing unit 110 confirms whether the connection state of the wireless link is maintained. When the connection is not maintained (NO in step S110), in step S111, disconnection processing is executed. Then, the processing ends.

Whether the connection state of the wireless link is maintained can be confirmed by analyzing the response information transmitted by the response monitor unit 106. For example, if the last portion of the response information is "0" (when reception of search response packet to the latest transmitted search packet is absent), it can be determined that the wireless link is disconnected. That is, it can be determined that a permanent interruption has occurred.

However, when it is determined in step S110 that the connection of the wireless link is maintained (YES in step S110), the process advances to step S112. In step S112, the control unit 108 controls an application according to the determined characteristics of the instantaneous interruption. For example, when the frequency of the instantaneous interruptions detected within a acceptable period of time for the instantaneous interruption operation is two times, the control unit 108 starts the image display application, transfers image data from the digital camera 1 to the display 2 in step S113, and also transmits a display request of the image data in step S114.

Then, the display 2 that has received the image data transmitted from the digital camera 1 and the display request of the image data displays the received image data on the display unit 203.

Further, when the frequency of instantaneous interruptions detected within a acceptable period of time for the instantaneous interruption operation is three times, the control unit 108, for example, starts the image storage application, transfers image data from the digital camera 1 to the display 2 in step S113, and also transmits a storage request of the image data in step S114. Then, the display 2 that has received the image data transmitted from the digital camera 1 and the storage request of the image data stores the received image data in the storage unit 204.

Thus, according to the present exemplary embodiment, an instantaneous interruption of the wireless link that the user has intentionally generated can be detected and also characteristics of the instantaneous interruption can be determined. Hence, an application can be controlled according to the determined characteristics of the instantaneous interruption.

Accordingly, the user may change a speed or a rhythm of the instantaneous interruption operation according to the application that the user intends to use. Thus, this can eliminate a complicated operation of wired data transfer and improve convenience of the user. Therefore, the UI can be realized, which uses the characteristics of the proximity wireless communication so that mere small separation of a distance between devices disconnects the wireless link and reflects an intuitive operation by the user.

Furthermore, in the present exemplary embodiment, the instantaneous interruption determination unit 107 has executed detection of instantaneous interruption and determination of characteristics of instantaneous interruption. However, the response monitor unit 106 may execute the determination of characteristics of the instantaneous interruption and according to the determined result, the control unit 108 may control an application.

Still furthermore, in the present exemplary embodiment, the digital camera has determined the characteristics of the instantaneous interruption of a wireless link based on the reception state of a search response packet to a search packet periodically transmitted therefrom within an acceptable period of time for an instantaneous interruption operation. However, the search packet may not be necessarily transmitted from the digital camera.

For example, within an acceptable period of time for the instantaneous interruption operation, a display may periodically transmit a search packet, and a digital camera may detect an instantaneous interruption of a wireless link and determine characteristics of the instantaneous interruption based on the reception state of the search packet.

Further, in the present exemplary embodiment, a system using a digital camera and a display has been described. However, the present invention can be applied to an information processing apparatus, if it has a proximity wireless communication function, such as a cellular phone, a printer, a digital video camera, and a personal computer (PC).

Furthermore, in the present exemplary embodiment, an example of starting the image display application or the image storage application according to characteristics of the instantaneous interruption generated within predetermined time has been described. However, another application may be started. The types of applications to be started can suitably be selected according to a combination of devices that configure a proximity communications system.

For example, in a combination of a digital camera and a printer, an image may be transferred from the digital camera to the printer and an image printing application may be executed according to the generated characteristics of the instantaneous interruptions.

Still furthermore, even if an application to be executed is similar, processing to be executed may be changed according to the generated characteristics of the instantaneous interruption. For example, image data to be transferred may be switched according to the generated frequency of instantaneous interruptions.

An image display application is exemplified here. A plurality of images are displayed on the display unit 112 on a digital camera, and one of these images is selected. Then, according to the frequency of instantaneous interruptions generated at that time, whether only an image in process of selection is transferred to a display to display the image on the display or all images in process of display are transferred to display on the display may also be switched.

Further, in a case of an image storage application, according to the generated frequency of instantaneous interruptions, whether only an image in process of display on the display unit 112 is transferred to a display to store it or all untransferred images are transferred to the display to store it may also be switched.

Furthermore, in a combination of a digital camera and a printer, whether only an image in process of display on the display 112 is printed or an image that is reserved to be printed in advance by a user is printed, or all images stored in a memory are printed may also be switched according to the generated frequency of instantaneous interruptions. Thus, as a method for controlling an application, there may be various methods.

Still furthermore, in the present exemplary embodiment, a case in which characteristics of the instantaneous interruption are determined on the digital camera side to control an application has been described. However, the characteristics of the instantaneous interruption may also be determined on the display side to control an application. In this case, the display can determine the characteristics of the instantaneous interruption of a wireless link based on the reception state of a search packet to be transmitted from a digital camera.

As described above, according to the present exemplary embodiment, control of data transfer processing positively utilizing the instantaneous interruption of a wireless link can be realized.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. As long as an image processing apparatus is capable of positively utilizing intentionally generated instantaneous interruptions of a wireless link to control a partner device and the processing of data transfer therebetween, the above-described embodiments may be modified and applied to numerous environments. Accordingly, the scope of the following claims is to be accorded the broadest reasonable interpretation so as to encompass all modifications, equivalent structures, and functions.

This application claims priority from Japanese Patent Application No. 2009-092309 filed Apr. 6, 2009, which is hereby incorporated by reference herein in its entirety.

What is claimed is:

1. A communication apparatus comprising:
    an antenna configured to transmit a signal and configured to receive a response signal corresponding to the transmitted signal from another communication apparatus;
    a determination unit configured to determine a reception pattern based on detecting presence or absence of reception of each of a plurality of response signals during a predetermined time;
    a storage unit configured to store pattern information for determining the reception pattern; and
    a control unit configured to control data processing so that data communicated between the communication apparatus and the another communication apparatus is processed according to a result of determination by the determination unit,
    wherein the determination unit determines the reception pattern to receive the response signal during the predetermined time based on the result of reception by the antenna and the pattern information stored in the storage unit.

2. The communication apparatus according to claim 1, wherein the control unit controls the another communication apparatus so that processing according to the result of determination by the determination unit is executed in the another communication apparatus.

3. The communication apparatus according to claim 1,
    wherein the storage unit is further configured to store image data, and
    wherein the control unit controls the another communication apparatus so that the image data transmitted to the another communication apparatus is displayed and/or stored in the another communication apparatus based on the result of determination by the determination unit.

4. The communication apparatus according to claim 1, wherein the control unit selects an application to start based on the result of determination by the determination unit.

5. The communication apparatus according to claim 1,
    wherein the antenna is configured to wirelessly transmit the signal and is configured to wirelessly receive the response signal from the another communication apparatus.

6. A method comprising:
    transmitting a signal;
    receiving in a communication apparatus a response signal corresponding to the transmitted signal from another communication apparatus;
    determining a reception pattern based on detecting presence or absence of reception of each of a plurality of response signals during a predetermined time;
    storing pattern information for determining the reception pattern; and
    controlling data processing so that data communicated between the communication apparatus and the another communication apparatus is processed according to a result of determining the reception pattern,
    wherein the determination of the reception pattern to receive the response signal during the predetermined time is based on the result of receiving the response signal and the stored pattern information.

7. A non-transitory computer-readable recording medium storing a set of instructions, which, when executed by a processor in a communication apparatus, causes the processor to perform a method comprising:
    transmitting a signal;
    receiving in a communication apparatus a response signal corresponding to the transmitted signal from another communication apparatus;
    determining a reception pattern based on detecting presence or absence of reception of each of a plurality of response signals during a predetermined time;
    storing pattern information for determining the reception pattern; and
    controlling data processing so that data communicated between the communication apparatus and the another communication apparatus is processed according to a result of determining the reception pattern,
    wherein the determination of the reception pattern to receive the response signal during the predetermined time is based on the result of receiving the response signal and the stored pattern information.

* * * * *